No. 833,763. PATENTED OCT. 23, 1906.
W. G. TITHERINGTON.
WHEEL FOR VEHICLES.
APPLICATION FILED AUG. 14, 1905.

Witnesses
H. M. Kuchul
A. J. McElhinney

Inventor
William G. Titherington
By Richardson
Attorneys

UNITED STATES PATENT OFFICE.

WILLIAM GEORGE TITHERINGTON, OF LIVERPOOL, ENGLAND.

WHEEL FOR VEHICLES.

No. 833,763.   Specification of Letters Patent.   Patented Oct. 23, 1906.

Application filed August 14, 1905. Serial No. 274,181.

*To all whom it may concern:*

Be it known that I, WILLIAM GEORGE TITHERINGTON, a subject of the King of England, and a resident of 27 Sandringham road, Tue Brook, Liverpool, in the county of Lancaster, England, have invented certain new and useful Improvements in Wheels for Vehicles, of which the following is a specification.

This invention has reference to wheels for vehicles, and has for its object to provide a tire or road-bearing surface consisting of segmental blocks or pieces of wood or other suitable material and means whereby said segments are secured in position outside the rim or felly of the wheel, as hereinafter described.

According to my invention the segmental blocks which comprise the tire are cut or recessed on both sides and are secured firmly in position by means of rings, one on either side of the wheel, which rings are each provided with an annular projection. The projection of the ring enters the recess in the segments, and these are so cut or formed that when the said rings are placed in position they tend to draw the segments inward toward the center of the wheel, thus binding them closely together. The rings are secured on the wheel by means of bolts, fastened through them at a suitable distance apart, and nuts, or they may be otherwise suitably secured.

In use should one or more of the segments need renewal this may be easily and readily effected by the removal of a ring referred to, when the segment or segments may be removed and another or others inserted in position, whereupon the ring is tightened up in position again. Further, should the tire as a whole need tightening this may be done by screwing up the rings so drawing the segments together by reason of the formation of the annular projection of the ring and the recesses in the segments, the movement of the segments being toward the center of the wheel.

Figure 1:
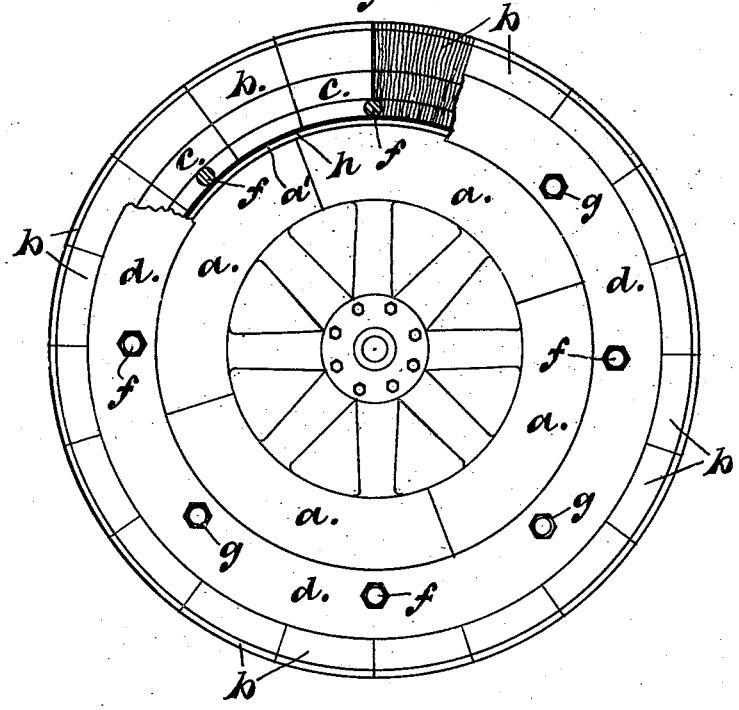
Figure 2:
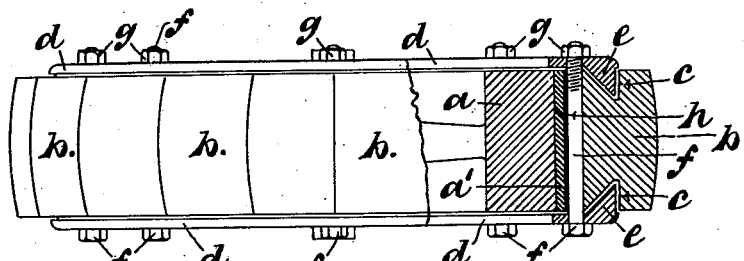
Figure 3:
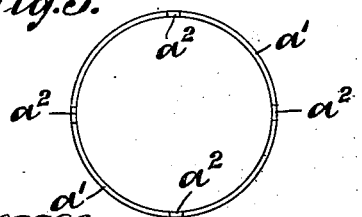
Figure 4:

In the accompanying drawings, Figure 1 is a side elevation, and Fig. 2 a plan, partly in section, of a wheel provided with my improvements. Figs. 3 and 4 are details.

$a$ represents a wheel rim or felly, of wood, and $a'$ an iron tire round it. This felly, however, may be of any other suitable construction and forms no part of the present invention.

$b$ represents the segmental blocks.

$c$ designates the cuts or recesses on each side of the blocks $b$.

$d$ represents the side rings, and $e$ the annular projections on same, which projections fit into the recesses of the blocks $b$, as shown.

$f$ indicates bolts by which the blocks $b$ and side rings $d$ are firmly secured to the felly $a$ $a'$, and $g$ represents nuts on $f$ for tightening.

$h$ is a rubber strip which may be disposed around $a'$, so as to afford a yielding bed for the blocks $b$.

When the blocks $b$ are of wood, the grain will preferably run endwise in the usual manner of segmental blocks for wheel-tires. (See Fig. 1.)

In some cases as an additional means of firmly securing the road bearing-blocks on the felly so as to prevent "creeping" I may provide lugs $d'$, which enter sockets $a^2$ of the felly $a'$. (See Figs. 3 and 4.)

As shown in the drawings, when the component parts of the wheel are first assembled sufficient space will be provided between projections $e$ and recesses $c$ to permit of the tightening of the blocks $b$ in the manner described.

Having now described my invention, what I claim as new, and desire to secure by Letters Patent, is—

The herein-described improvements in wheels for vehicles comprising in combination a felly $a$; a tire or road-bearing surface of wooden segmental blocks $b$ recessed at $c$ on their side edges; side rings $d$ having projections $e$ fitting in said recesses whereby the blocks may be adjusted by reason of the provision of "play" or "draw" provided between the recesses $c$ and projections $e$; lugs $d'$ on rings $d$ adapted to fit in sockets in the felly $a$; a yielding bed between the blocks and felly; and means for tightening and adjusting the rings $d$; substantially as described.

In testimony whereof I have signed my name to this specification in the presence of two subscribing witnesses.

WILLIAM GEORGE TITHERINGTON.

Witnesses:
 JOHN H. WALKER,
 WM. BARKER.